United States Patent Office 3,350,291
Patented Oct. 31, 1967

3,350,291
METHOD OF PREPARING STRAINED
POLYCYCLIC HYDROCARBONS
Rangaswamy Srinivasan, Briarcliff Manor, N.Y., assignor to International Business Machines Corporation, New York, N.Y., a corporation of New York
No Drawing. Filed Sept. 25, 1964, Ser. No. 399,358
15 Claims. (Cl. 204—162)

The invention relates to a method of preparing strained polycyclic hydrocarbons, and more particularly, to a process for the photolytic synthesis of polycyclic hydrocarbons from cyclic diolefins using a metal salt or its $\pi$ complex with a cyclic diolefin as a photoisomerization catalyst.

The attempt to prepare polycyclic hydrocarbons by standard chemical methods have been generally unsuccessful, and at best, have resulted in extremely low yields so as to make these processes impractical. Photolytic processes for preparing polycyclic hydrocarbons are known and have been more successful than the purely chemical methods of preparation. The photolytic method provides a relatively convenient route for the preparation of polycyclic hydrocarbons. However, the prior art photolytic processes have a major disadvantage in that they require direct irradiation which requires very low wave lengths of the ultraviolet spectrum (i.e., below 2200 A.). This requirement necessitates expensive and relatively inaccessible actinic light sources.

In an attempt to avoid the use of such expensive equipment, some photolytic processes utilized photosensitizers (e.g., acetone, acetophenone, or benzophenone) to facilitate the synthesis of polycyclic compounds. The major disadvantages with the processes using the aforesaid photosensitizers is the difficulty of separation of the product from the photosensitizers, i.e., the inability to obtain a pure product. Because the photosensitizers are either liquids or low melting solids they are difficult to separate from the polycyclic product which are generally also liquids. The usual problems of liquid-liquid separations occur, e.g., the formation of azeotropes during distillation.

Mercury has also been used as a photosensitizer in the photolytic process of preparing polycyclic compounds. However, the process, using the Hg as photosensitizer, produces low yields of the polycyclic product.

It is an object of this invention to provide an improved photolytic method of preparing polycyclic hydrocarbons.

Another object of this invention is to provide an improved method for using an effective catalyst for the photoisomerization of cyclic diolefins.

An advantage of this invention is that it provides a photolytic method for preparing polycyclic hydrocarbons utilizing inexpensive and readily available actinic light sources.

Another advantage of this invention is that the polycyclic hydrogen products are obtainable in high yields.

Still another advantage is the ease of purification of the product since it is simple to free the liquid product from the solid catalyst used in this invention.

The foregoing and other objects and advantages of the invention will be apparent from the following more particular description of the invention, as illustrated in the examples.

In accordance with an aspect of the invention there is provided a process for exposing a cyclic diolefin to actinic light in the presence of a catalyst capable of inducing isomerization of said cyclic diolefin as an intermediate step in the overall synthesis of polycyclic hydrocarbons. After the photolysis is complete, the polycyclic hydrocarbon product is recovered by any conventional means.

In accordance with another aspect of this invention there is provided a cyclic diolefin and metal salt $\pi$ complex which can induce the photoisomerization of cyclic diolefins.

The catalyst used in this method for the preparation of the tricyclic hydrocarbon may be a cuprous salt such as the cuprous halides, nitrates, or sulfate. It has been found, however, that not all cuprous salts are equally suitable as various species thereof will cause faster rates and higher yields of the polycyclic product. In a series of experiments it has been found that the cuprous halide salts are the most preferred. Of the halides, the chlorides are most preferred, with the others being less preferred.

Another preferred catalyst is the cuprous chloride $\pi$ complex of 1,5-cyclooctadiene. This catalyst is prepared by reacting 1,5-cyclooctadiene and a solution of cuprous chloride in hydrochloric acid. The catalyst has an empirical formula of $C_8H_{12}CuCl$ and may be structurally represented by

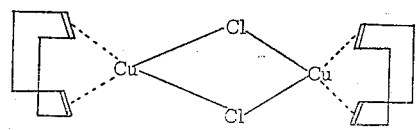

The $\pi$ complex as a catalyst is particularly preferred in the preparation of quadricyclene, which has the structure

Any actinic light source is suitable for the processes of the present invention. However, for the purposes of this invention, the use of mercury light sources of low pressure is preferred. Mercury lamps of this latter type are represented by the conventional germicidal lamps which are inexpensive and are readily available. High pressure mercury arc lamps such as the 1000 watt mercury lamp may also be used.

While any mercury light source having ultraviolet radiation less than 3200 A. can be used, the preferred source is one having a strong 2537 A. Hg line radiation. The light source employed in the process of this invention was a bank of sixteen commercially available General Electric G8T5 lamps placed circularly around the reaction cell in which the process is carried out. In this way absorbed intensities of the order of $10^{15}-10^{17}$ quanta/sec. at 2537 A. were obtained in the reaction cell.

It should be clear that other configurations of lamp banks can be used as well as other suitable actinic light sources.

Since the products obtained from the process are generally liquids, the means employed for separation of the polycyclic product from the reaction medium include filtration and distillation, or preparative gas chromatography. In other words the products can be separated from the reaction medium by conventional means.

Example I

A solution containing 10 g. of 1,5-cyclooctadiene in 2.5 liters of ether is saturated with cuprous chloride. The reaction vessel containing the solution is placed in the center of a bank of mercury lamps and is irradiated for about 40 hours. After irradiation the solution is fractionally distilled to recover tricyclo[3.3.0.0$^{2,6}$]octane as the major product. The product is found to have the following physical characteristics: boiling point 123°–124° C., $n_D^{25}$ 1.4680, infrared spectrum (3.3–3.45 microns (s), 7.77 (m), 8.13 (m), 9.12 (m), 11.03 (m), and 14.69). Calcd.: C, 88.82; H, 11.19. Found: C, 88.46; H, 11.19; M.W. 108 (mass spectrum), yield 40%.

Example II

The process of Example I, except the 1,5-cyclooctadiene is saturated with the π complex of cuprous chloride and 1,5-cyclooctadiene. The same reaction product as that of Example I was produced.

Example III

A solution containing 10 grams of bicyclo[2.2.1]hepta-2,5-diene in 2.5 liters of ether is saturated with the CuCl–1,5-cyclooctadiene π complex. The solution is irradiated by a bank of mercury lamps for about 40 hours. After irradiation, pure quadricyclene is obtained by preparative gas chromatography. The product has a boiling point of 108° C. decomposing at 140° C., yield 80%.

The products produced by the process of this invention have application in the preparation of medicinals. It is believed that these compounds in suitable carriers may have antiviral activities. Because of the highly strained ring systems these compounds are very reactive and are therefore also valuable as high energy fuels.

While the invention has been particularly described with reference to specific examples thereof, it will be understood by those skilled in the art that various changes in procedures may be made therein without departing from the spirit and scope of the invention.

What I claim is:

1. A method of preparing tricyclo-[3.3.0.0$^{2,6}$]octane which comprises exposing 1,5-cyclooctadiene, saturated with cuprous chloride as the photoisomerizing catalyst, to actinic light.

2. A method of preparing tricyclo-[3.3.0.0$^{2,6}$]octane which comprises exposing 1,5-cyclooctadiene, saturated with the π complex of cuprous chloride and 1,5-cyclooctadiene as the photoisomerizing catalyst, to actinic light.

3. A method of preparing tricyclo-[3.3.0.0$^{2,6}$]octane which comprises exposing 1,5-cyclooctadiene, saturated with cuprous chloride as the photoisomerizing catalyst, to the ultraviolet radiation less than 3200 A.

4. A method of preparing tricyclo-[3.3.0.0$^{2,6}$]octane which comprises exposing 1,5-cyclooctadiene, saturated with the π complex of cuprous chloride and 1,5-cyclooctadiene as the photoisomerizing catalyst, to the ultraviolet radiation less than 3200 A.

5. A method of preparing tricyclo-[3.3.0.0$^{2,6}$]octane which comprises irradiating 1,5-cyclooctadiene with the 2537 A. Hg line of the ultraviolet spectrum in the presence of the π complex of cuprous chloride and 1,5-cyclooctadiene as the catalyst.

6. A method of preparing tricyclo-[3.3.0.0$^{2,6}$]octane which comprises irradiating 1,5-cyclooctadiene with the 2537 A. Hg line of the ultraviolet spectrum in the presence of the cuprous chloride as the catalyst.

7. A method of preparing tricyclo-[3.3.0.0$^{2,6}$]octane comprising the steps of:

exposing an ethereal solution, saturated with cuprous chloride as the photoisomerizing catalyst, containing 10 grams of 1,5-cyclooctadiene in 2.5 liters of ether, to actinic light, and fractionally distilling the irradiated solution to obtain pure tricyclo-[3.3.0.0$^{2,6}$]octane.

8. The method of claim 7 wherein the actinic light is ultraviolet radiation of a wave length less than 3200 A.

9. The method of claim 7 wherein the photoisomerizing catalyst is the π complex of cuprous chloride and 1,5-cyclooctadiene.

10. A method of preparing quadricyclene which comprises exposing bicyclo[2.2.1]hepta-2,5-diene to actinic light in the presence of CuCl π complex of 1,5-cyclooctadiene photoisomerizing catalyst.

11. A method of preparing quadricyclene which comprises exposing bicyclo[2.2.1]hepta-2,5-diene to ultraviolet radiation having wave lengths less than 3200 A. and in the presence of CuCl π complex of 1,5-cyclooctadiene photoisomerizing catalyst.

12. A method of preparing quadricyclene comprising the steps of:

exposing an ethereal solution, saturated with cuprous chloride π complex of 1,5-cyclooctadiene photoisomerizing catalyst, containing 10 grams of bicyclo[2.2.1]hepta-2,5-diene in 2.5 liters of ether, to actinic light, and purifying the product by preparative gas chromatography.

13. The method of claim 12 wherein the actinic light is ultraviolet radiation of a wavelength less than 3200 A.

14. The method of preparing polycyclic hydrocarbons by photolysis of cyclic diolefins including photoisomerizing said cyclic diolefins in the presence of cuprous chloride as the catalyst.

15. The method of preparing polycyclic hydrocarbons by photolysis of cyclic diolefins including photoisomerizing said cyclic diolefins in the presence of cuprous chloride 1,5-cyclooctadiene π complex as the catalyst.

References Cited

A. Z. Cope: The Journal of the American Chemical Society, vol. 84, p. 4850, Dec. 20, 1962.

R. J. Czetanozic et al.: The Journal of Chemical Physics, vol. 37, No. 3, p. 543, Aug. 1, 1962.

W. G. Dauben et al.: Tetrahedron, vol. 15, pp. 197 to 201, 1961.

R. Srinivasan: The Journal of the American Chemical Society, vol. 85, pp. 819–820, Mar. 20, 1963.

R. Srinivasan: The Journal of the American Chemical Society, vol. 85, pp. 3048–3049, Oct. 5, 1963.

HOWARD S. WILLIAMS, *Primary Examiner.*

JOHN H. MACK, *Examiner.*